Aug. 3, 1937.   W. DÄLLENBACH   2,088,842
ULTRA SHORT WAVE GENERATOR
Filed April 17, 1934

Inventor:
W. Dällenbach

By: Marks+Clerk
Attys.

Patented Aug. 3, 1937

2,088,842

UNITED STATES PATENT OFFICE 2,088,842

ULTRA SHORT WAVE GENERATOR

Walter Dällenbach, Berlin-Charlottenburg, Germany, assignor to N. V. Machinerieen-en Apparaten Fabrieken "Meaf", Utrecht, Netherlands Application April 17, 1934, Serial No. 721,050
In Germany April 4, 1933

6 Claims. (Cl. 250—36)

This invention relates to ultra short wave generators.

When electric discharge tubes are used for producing, amplifying or receiving electric ultra high frequency oscillations, difficulties arise, some of which are described below.

The strain on the electrodes increases with rising frequency due to the required stronger excitation, and is particularly great at the frequency of the so-called centimeter and decimeter waves. Furthermore, in case of these ultra high frequency oscillations, the frequency cannot be varied in the same convenient manner as the usual broadcasting frequencies by means of adjustable elements of self-induction and capacity.

If, as for instance in the case of centimeter waves, the frequency depends chiefly upon the electric system formed by the electrodes themselves, reception of these oscillations is possible only by employing on the reception side exactly the same kind of tube used for generating.

It has been attempted to overcome these troubles by using, for instance, an alternator operating with the line voltage or being of a special type as source of energy for producing the oscillations. As only one half-wave is utilized, the thermal load of the electrodes will decrease at higher peak load and at equal or even greater radiated power. It has further been proposed to employ electromechanical interrupters for passing the voltage of a battery to the oscillation generator at the desired rhythm, but interrupters with movable parts are open to the objections which can be made against any moved device.

To overcome the known defects the invention proposes that in devices for transmitting, receiving and amplifying undamped, particularly ultra short, electric oscillations by means of electric discharge tubes, e. g., triodes and multiple grid valves in feed back or damping field connections diodes with or without magnetic field, gas discharging tubes, or in other exciting devices, the intermittent currents and voltages impressed upon the electrodes to produce the oscillations are generated by so-called tilting oscillations. The problem of load in case of very high voltages impressed upon the electrodes can be readily solved by shortening the interval of exciting the ultra high frequency oscillations relative to the period of tilting oscillations which facilitate the provision and variation of intervals between the individual current or voltage impulses more than any other method. The frequency of these tilting oscillations lies preferably within range of best audibility, e. g., between 50 and 3000 hertz. Since the voltage and the current of the tilting oscillation varies during a period of oscillation, the frequency of the oscillation generator will be varied also, and by corresponding forming of the current or voltage curves, which can be conveniently carried out in case of tilting oscillations, it becomes possible to impress the range of existence of the oscillations as function of the voltages or currents required for maintenance in such a way that the variation in frequency becomes a maximum. In this way, a broad frequency band will be obtained which is particularly favorable for the reception of ultra high frequency oscillations. It is further possible to have the range of existence of the oscillations impressed along the curve of greatest energy, it being the usual procedure of course to combine the demand for extent of frequency with that for greatest energy yield. All necessary impressions of the range of existence of the oscillations can be carried out by co-phasal or non-co-phasal control of the voltages and currents produced by the tilting oscillations and required for the generation of oscillations. For example, in case of a damping field circuit, the variables of the range of existence will be the anode and grid potentials. At co-phasal control of the anode and grid potentials the range of existence of the oscillations will be impressed in a straight line in dependence upon the anode and grid potentials. If the latter are no longer co-phasal, the range of existence is impressed in a closed curve which if possible corresponds to the demands for maximum energy yield and greatest width of the frequency band.

By way of example, the invention is illustrated diagrammatically in the Figures 1 and 2 of the accompanying drawing.

Figure 1:
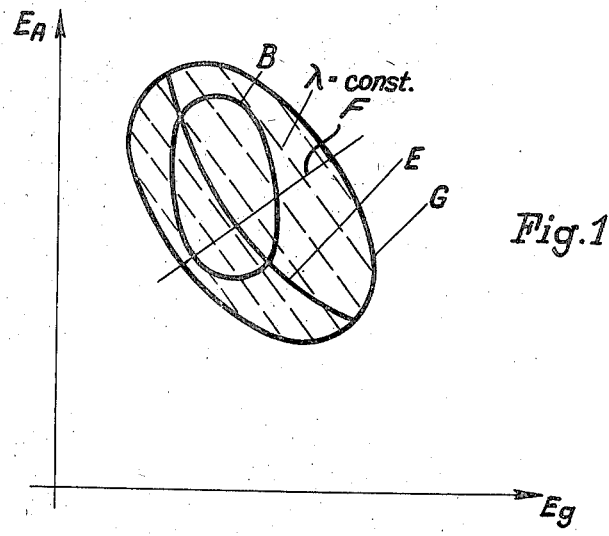
Fig. 1 shows some curves illustrating the operation of the short wave oscillator tubes dependent upon the voltages applied.

In Fig. 1, the diagram shows the arrangement just spoken of for the generation of oscillations by a damping field circuit in the form of a Barkhausen-Kurz connection. The variables of the range of existence of the oscillations for the damping field circuit are $Ea$, as anode potential, and $Eg$, as grid potential. The range G is provided with a heavy border. The broken lines are the curves $\lambda=$ constant, the line F being a perpendicular for these curves, which crosses the range G at its broadest point and along which the variation in frequency is therefore relatively the greatest. The line E is the curve along which the energy yield is relatively the largest. B is a closed curve within the range of existence of the oscillations and shows, for example, the course of the voltages Eg and Ea supplied by the generator of tilting oscillations and when the said voltages have been made non-cophasal to each other by a suitable intermediate member. If it is desired to impress the range of existence, which is surrounded by the curve G, so that there is a maximum variation in frequency as well as the maximum variation in energy, the phase relation between the voltages Eg and Ea must be such that the curve F will be passed through. The curve F may also extend outside the range of existence surrounded by B. The currents and voltages required for impressing the range may come from one and the same generator of tilting oscillations, though usually they will not be taken therefrom directly but through an intermediate member, either because the voltages of the tilting oscillations are not high enough or the current intensity fails to have the corresponding degree or the curvature of current and voltage has to be formed or for other reasons. The currents and voltages may be formed by means of one or several intermediate members. The simplest possibility of impressing any range of existence of the oscillations is afforded by the potentiometer connection, the applicability of which with respect to the damping field circuit will be evident. The necessity of using an intermediate member becomes apparent when the invention is applied to the magnetron connection, in which case the variables determining the existence of the oscillations are the anode potential and the magnetic field or the coil current, the so-called critical anode potential rising with the intensity of the magnetic field. It is therefore necessary to step up the voltage of the tilting oscillation to attain the critical voltage, and, simultaneously, to increase the current intensity, preferably by the interposition of an amplifying device. In case of a damping field circuit it is further sometimes necessary to regulate the heating current. If a transformer is used as intermediate member, it must be provided with a special winding for the heating current for stepping down the usually high tilting oscillation voltage in favor of greater current intensity. The intermediate members can, at the same time, be used for correspondingly forming the current and voltage curves by the known methods.

With respect to the problem with which the invention is concerned there are several possibilities of producing the tilting oscillations. Generation by means of gaseous conduction lamps is known, which means that with the aid of a resistance element, such as an ohmic resistance, a choker or the like, a condenser is charged, parallel to which a gaseous conduction or discharge lamp is arranged in series with a resistance of usual type. The discharge lamp may be replaced by a controlled gas discharge tube, particularly with hot cathode, in corresponding connection, and the ignition tension of the discharge lamp will then be made up for by the positive character of the control voltage. Tilting oscillations produced by high vacuum electron valves can be used also.

Figure 2:
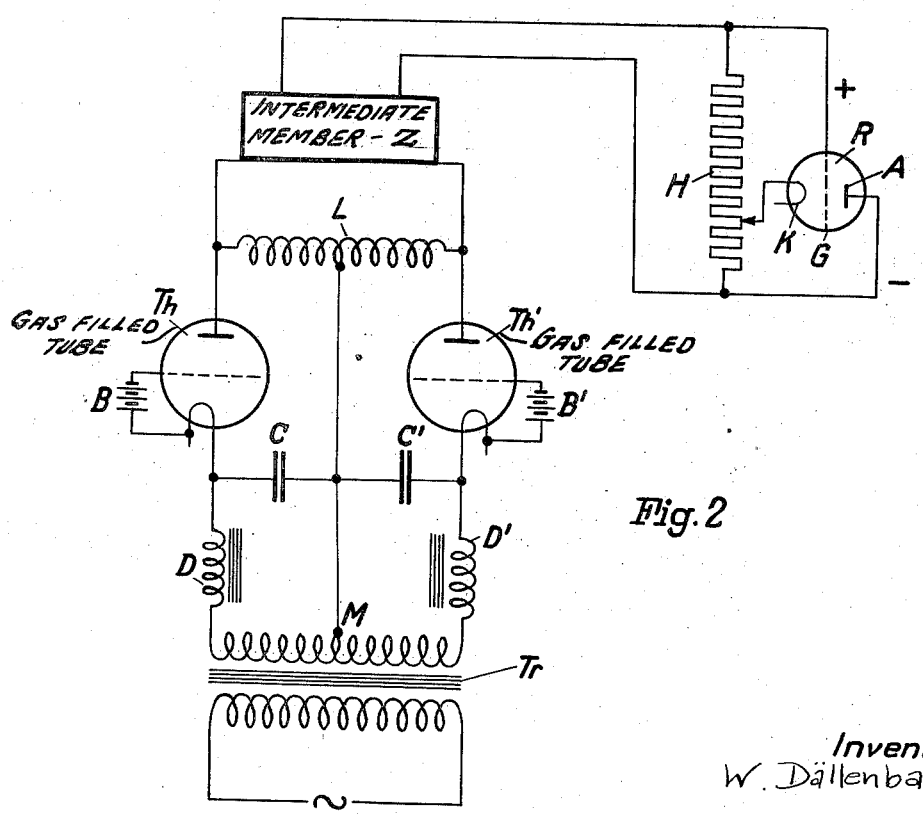
Fig. 2 is a connection diagram of one form of the invention.

In operating the tilting oscillation generator from a source of alternating potential it is further possible to utilize both half-waves of the alternating current. In Fig. 2 Tr indicates a transformer; M, the center tapping; D and D' are two chokes or resistances; C and C', two equal condensers; Th and Th' two controlled gas discharge tubes with hot cathode; and L is a resistance or self-induction. By variation of the grid potential B the point of application of the breakdown anode potential of the controlled gas discharge tube can be varied at will.

From the intermediate member Z shown in the drawing conductors lead to the generator tube R. In the example shown a damping field circuit is chosen, in which the voltage supplied by the intermediate member is subdivided by a potentiometer H. The anode A is disposed at the negative end of the potentiometer and the grid G at the positive end. The distribution of voltage is fixed by the sliding contact of the inlet of the cathode K.

I claim:—

1. An ultra short wave oscillation producing device, comprising a tube having an anode, a cathode and a grid, means for applying a positive potential to said grid and a negative potential to said anode with respect to said cathode, whereby ultra-high frequency energy is produced by said tube, said means comprising a tilting oscillator and electrical connections from said tilting oscillator to the electrodes of said tube, said tilting oscillator also acting to vary the potentials of the electrodes periodically according to the period of the tilting potentials.

2. An ultra short wave oscillation producing device, comprising a tube having an anode, a cathode and a grid, means for applying a positive potential to said grid and a negative potential to said anode with respect to said cathode, whereby ultra-high frequency energy is produced by said tube, said means comprising a tilting oscillator and electrical connections from said tilting oscillator to the electrodes of said tube, said tilting oscillator also acting to vary the potentials of the grid and anode periodically and simultaneously from their zero to their maximum value corresponding to the period of the tilting oscillator.

3. An ultra short wave oscillation producing device, comprising a tube having an anode, a cathode and a grid, means for applying a positive potential to said grid and a negative potential to said anode with respect to said cathode, whereby ultra-high frequency energy is produced by said tube, said means comprising a tilting oscillator and electrical connections from said tilting oscillator to the electrodes of said tube, said tilting oscillator also acting to vary the potentials of the electrodes periodically according to the period of the tilting potentials, said tilting oscillator being adjusted with respect to said tube so as to provide variable grid and anode potentials such that the ultra-high frequency varies during one period of said tilting oscillator frequency between the maximum possible value of the frequency and the minimum value.

4. An ultra short wave oscillation producing device, comprising a tube having an anode, a cathode and a grid, means for applying a positive potential to said grid and a negative potential to said anode with respect to said cathode, whereby ultra-high frequency energy is produced by said tube, said means comprising a tilting oscillator and electrical connections from said tilting oscillator to the electrodes of said tube, said tilting oscillator also acting to vary the potentials of the electrodes periodically according to the period of the tilting potentials, said tilting oscillator being adjusted with respect to said tube so as to provide variable grid and anode potentials such that the ultra-high frequency energy varies during a tilting oscillation period of said tilting oscillator frequency along the curve of the greatest energy in the existence range of the oscillations.

5. An ultra short wave oscillation producing device, comprising a tube having an anode, a cathode and a grid, means for applying a positive potential to said grid and a negative potential to said anode with respect to said cathode, whereby ultra-high frequency energy is produced by said tube, said means comprising a tilting oscillator and electrical connections from said tilting oscillator to the electrodes of said tube, said tilting oscillator also acting to vary the potentials of the electrodes periodically according to the period of the tilting potentials, said tilting oscillator being adjusted with respect to said tube so as to provide variable grid and anode potentials such that the ultra-high frequency energy varies during a tilting oscillation period of said tilting oscillator frequency along the curve of the greatest energy in the existence range of the oscillations, the frequency of the tilting oscillations lying between 50 and 3000 hertz, and means for regulating said potentials comprising a potentiometer between said tilting oscillator and the grid and the anode of the ultra-short wave generator.

6. An ultra short wave oscillation producing device, comprising a tube having an anode, a cathode and a grid, means for applying a positive potential to said grid and a negative potential to said anode with respect to said cathode, whereby ultra-high frequency energy is produced by said tube, said means comprising a tilting oscillator comprising two tubes connected with an alternating current source so that both half waves of the alternating current are converted into tilting oscillations, and electrical connections from said tilting oscillator to the electrodes of said tube, said tilting oscillator also acting to vary the potentials of the electrodes periodically according to the period of the tilting potentials, said tilting oscillator being adjusted with respect to said tube so as to provide variable grid and anode potentials such that the ultra-high frequency energy varies during a tilting oscillation period of said tilting oscillator frequency along the curve of the greatest energy in the existence range of the oscillations, the frequency of the tilting oscillations lying between 50 and 3000 hertz.

WALTER DÄLLENBACH.